United States Patent
Rossman et al.

(10) Patent No.: US 9,967,285 B1
(45) Date of Patent: May 8, 2018

(54) SUPPLYING REGULATORY COMPLIANCE EVIDENCE FOR A SERVICE PROVIDER ENVIRONMENT

(71) Applicant: Amazon Technologies, Inc., Seattle, WA (US)

(72) Inventors: Hart Matthew Rossman, Vienna, VA (US); Jessica Paige Beegle, Seattle, WA (US); Christopher John Whalley, Seattle, WA (US); Aaron John Wilson, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 14/864,777

(22) Filed: Sep. 24, 2015

(51) Int. Cl.
*G06F 21/00* (2013.01)
*H04L 29/06* (2006.01)
*G06F 17/30* (2006.01)

(52) U.S. Cl.
CPC ........ *H04L 63/20* (2013.01); *G06F 17/30914* (2013.01); *H04L 63/1433* (2013.01)

(58) Field of Classification Search
CPC ........................................................ H04L 63/20
USPC ............................................................ 726/1
See application file for complete search history.

(56) References Cited

U.S. PATENT DOCUMENTS

| | | | | |
|---|---|---|---|---|
| 2003/0093684 A1* | 5/2003 | Kaiserswerth | ...... | H04L 63/0428 713/193 |
| 2010/0082991 A1* | 4/2010 | Baldwin | ................. | H04L 9/083 713/176 |
| 2015/0033086 A1* | 1/2015 | Sasturkar | ............ | G06F 11/0709 714/57 |
| 2016/0139938 A1* | 5/2016 | Dimitrakos | ......... | G06F 9/44505 718/100 |

* cited by examiner

*Primary Examiner* — Longbit Chai
(74) *Attorney, Agent, or Firm* — Thorpe North Western, LLP

(57) ABSTRACT

Technology is described for supplying regulatory compliance evidence for a virtual computing service provider. A request is received for providing regulatory compliance evidence for a service provided by a virtual computing service provider. A statistical analysis of subject matter relating to the request using machine learning is provided. The subject matter associated with the request is categorized. The categorized subject matter is mapped to a control list, maintained for compliance regulations, that is mapped to the regulatory compliance evidence. A confidence level for the regulatory compliance evidence is developed according to historical data relating to previously provided regulatory compliance evidence. A response, having both the regulatory compliance evidence associated with the request and the regulatory confidence level, is provided with a set of digital signatures. An authenticated user feedback response is provided indicating an accuracy level that the response matches the request for developing the confidence level.

20 Claims, 8 Drawing Sheets

SUPPLYING REGULATORY COMPLIANCE EVIDENCE FOR A SERVICE PROVIDER ENVIRONMENT

BACKGROUND

Computer systems may be found in the workplace, at home, or at school. Computer systems may include computing and data storage systems to process and store data. Many organizations and business entities utilizing a computing system are governed by corporate or governmental compliance regulations. These entities are concerned, for example, with enforcement of corporate or governmental rules, regulations, and/or policies for protection of confidential data, protection of data that contains user phrases and numeric patterns, and compliance with governmental regulations. Some of the governmental regulations that are related to security and risk management include, but are not limited to, GLBA (Gramm-Leach-Bliley Act), HIPAA (Health Insurance Portability and Accountability Act), SOX (Sarbanes-Oxley Act) and the U.S. Securities and Exchange Commission's (SEC's) Regulations.

Validation of computing configurations and compliance at the time of activation or service is part of a management process and governance for compliance with the various governmental or corporate regulations. Most information technology (IT) organizations work to comply with these compliance regulations to ensure that security risks, governance controls and vulnerabilities are proactively managed through the lifecycle of the service provided by a computing system. In existing approaches, the validation processes are carried out through manual steps that are time consuming and error prone. This lengthy process is particularly troublesome when providing managed virtual computing services to enterprise users.

DETAILED DESCRIPTION

Figure 1:
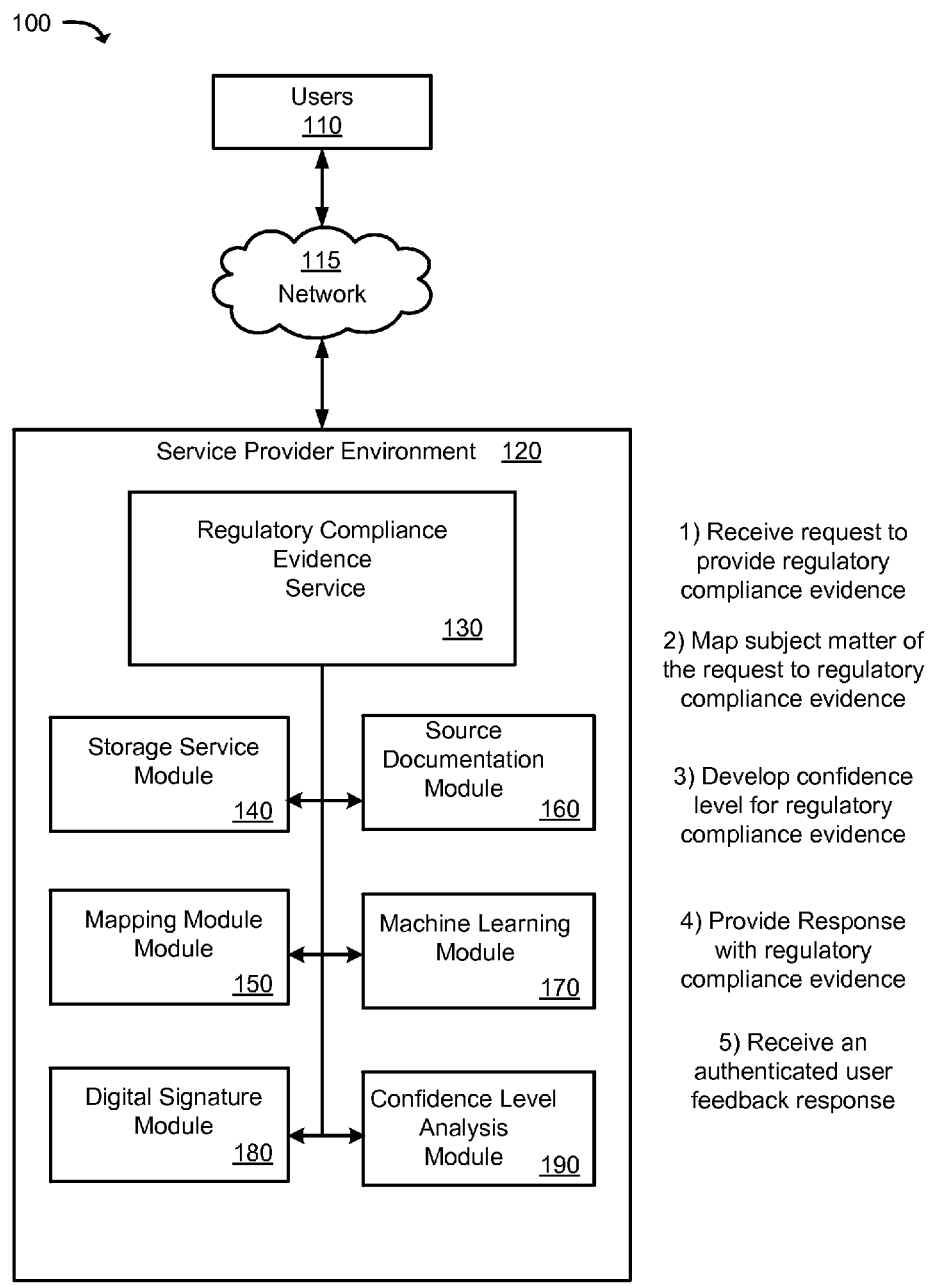
FIG. 1 illustrates a system for supplying regulatory compliance evidence in a service provider environment according to an example of the present technology.

This technology relates to providing computing systems and resources, such as a virtual computing service, for supplying compliance evidence that validates compliance with compliance questions or one or more compliance regulations applied to large-scale virtualized computing resources used by many users or industries having diverse needs. For example, in one aspect, a service provider environment with virtual computing services is provided to allow a single physical computing machine to be shared among multiple users by providing each user with one or more computing instances hosted by the single physical computing machine using a hypervisor. Each computing instance may be a guest machine acting as a distinct logical computing system that provides a user with the perception that the user is the sole operator and administrator of a given virtualized hardware computing resource. The virtual computing services in the service provider environment may offer end users on-demand access to information, such as compliance evidence, on a global basis. A service provider environment may be managed and maintained by a virtual computing service provider to provide virtualized computing services.

In one aspect, a technology is described for supplying regulatory compliance evidence for a service provider environment. A request may be received for providing signed regulatory compliance evidence about a service provided by a computing service provider (e.g., a virtual computing service provider). A statistical analysis of subject matter relating to the request using machine learning may be provided for interpreting the request. The subject matter associated with the request may be mapped to the signed regulatory compliance evidence maintained for compliance regulations. A confidence level for the regulatory compliance evidence may be developed according to historical data relating to previously provided regulatory compliance evidence and user feedback. A response may be provided with the regulatory compliance evidence having a set of digital signatures along with the regulatory confidence level. For example, a first digital signature for a response may be from a third-party verification service or a third-party tester who has supplied or verified the regulatory compliance evidence. Further, a second digital signature may be provided from the computing service provider. The response may be dynamically provided on-demand with a summary response and/or source documentation supplied to the user. An authenticated user feedback response is provided relating to the response and the authenticated user feedback response may indicate an accuracy level that the response matches the request. The user feedback response may be used for developing the confidence level. The authenticated user feedback response may also include a digital signature. In one aspect, the signed regulatory compliance evidence may be stored and/or maintained in the service provider or by a third-party service in communication with the service provider.

In one example, the subject matter associated with the request may be categorized according to the statistical analysis. The categorized subject matter may be mapped to a control list that may include required compliance regulations, rules, and/or policies maintained for compliance regulations, and the control list may be mapped to the regulatory compliance evidence for associating the regulatory compliance evidence with the request. A confidence level for the regulatory compliance evidence may be developed according to historical data relating to previously provided regulatory compliance evidence. A response, having both the regulatory compliance evidence associated with the request (e.g., references to documents or access to stored documents) and the regulatory confidence level (e.g., a numerical value for the confidence of the third party or other audit evaluations) may be provided with a digital signature provided by the virtual computing service provider and/or third party auditor or evaluator. In another example, the response may be authenticated by encrypting a portion of data associated with the response for providing the digital signature.

A confidence level for the regulatory compliance evidence may be developed according to historical data relating to previously provided regulatory compliance evidence. As part of developing the confidence level, user feedback may be received relating to the response indicating an accuracy level or satisfaction level that indicates how accurate the response matches the request. The user feedback relating to the response or specific regulatory compliance evidence (e.g., evidence documents) may be received and recorded after sending the response to the user. For example, the user feedback may be a satisfaction rating or "accuracy level rating" having a predefined range, such as between 0 and 10, which the user may select. Also, a predefined threshold may be set and those values above and/or below the threshold may indicate the provided regulatory compliance evidence relates and/or does not relate to the request. The satisfaction rating or "accuracy level rating" may be used to identify how accurate the response with the provided regulatory compliance evidence relates to the request. For example, a lower value, such as user feedback having an accuracy level rating of "2" may indicate the provided regulatory compliance evidence fails to match the user's request. Alternatively, a higher value, such as 9, may indicate that the provided regulatory compliance evidence matches the user's request. The accuracy level may be used to develop the confidence level indicating the provided regulatory compliance evidence matches the query, questions, key words, subject matter, or other identified query associated with the request.

In one example configuration, a statistical regression model may be used to create a machine learning model to establish the mapping of the key words to a compliance list and/or the source documentation. That is, the statistical regression model may establish a statistical probability that indicates the mapping of the key words, subject matter, phrases, and/or questions in the request to a control list and/or then a mapping to source documentation. Previously matched key words, word clusters, and/or previously provided responses may be included in the probability model to create the machine learning model. Currently mapped key words, subject matter, phrases, and/or questions in the request may also be compared to previously mapped key words, subject matter, phrases, and/or questions in previous requests to assist in determining the statistical probability for mapping. In another example, a response mapped to source documentation supplied by a third party with the regulatory compliance evidence having a summary of the regulatory compliance evidence may be provided and signed with a digital signature of the third party and the virtual computing service provider, or an alternative response may be provided indicating the regulatory confidence level with the compliance evidence having the digital signature provided by the virtual computing service provider.

For example, a statistical probability having a success rating above a predetermined probability indicates the mapping is more accurately matched to a control list (or individual items in a control list) and/or source documentation. Alternatively, a statistical probability having a success rating below a predetermined probability indicates the mapping is less accurately matched to control list (or individual items in a control list) and/or source documentation.

The machine learning model may also use the accuracy level rating (i.e., the "accuracy level") and other user feedback that may be provided over time. The machine learning model may also be used to develop the confidence level. For example, the statistical analysis probability may be used to indicate whether the key words, subject matter, phrases, and/or questions in the request are accurately mapped to a control list that is mapped to the regulatory compliance evidence (e.g., source documentation). For example, the statistical analysis probability may be within a predefined percentage range, such as between zero (0) and one hundred (100). Thus, any percentage above and/or greater than a predefined threshold statistical analysis probability (e.g., 50%) may be deemed more accurate than any percentage below or less than the predefined threshold statistical analysis probability. In addition, as the training data for the machine learning model is updated over time, the accuracy of the model may increase.

A content lexicon may also be built over time based on the key words, subject matter, phrases, and/or questions in the request and the lexicon items may be mapped to the control list and/or the source documentation for increasing the confidence level of providing regulatory compliance evidence. Moreover, the response may include source documentation as part of supplying the regulatory compliance evidence. Furthermore, the source documentation of the regulatory compliance evidence may be analyzed for determining which regulatory compliance evidence to provide in the response based on the mapping or previously provided responses. The source documentation may include change management records, document control records, service level agreement performance records, regulatory compliance service records, hardware records, and software records. The request may be submitted and a response may be provided to the user via an application programming interface (API).

As a more specific example, a technology is provided for exposing virtual computing service provider regulatory compliance evidence to users with life sciences requirements. The technology may receive and authenticate a request from the user for the virtual computing service provider regulatory compliance evidence. The technology may process the request against unique source content provided from back-end virtual computing service provider systems. The source content may include, but not be limited to, change management records, document control records, distributed process information, hardware/software health service records (e.g. mean time between failures "MTBF" service records), service level agreement performance records, and/or other compliance evidence maintained by the virtual computing service provider as evidence of security, quality management, and risk/compliance programs. Customer specific source content or other unique source content may also be aggregated from user-facing application programming interface (API), security and authentication policies, and build template stack details for computing resources, etc. The source content corresponding to the request may then be returned to the requesting client in a response (e.g., a response including a summary of the compliance evidence). Moreover, virtual computing resources may be audited to create the information stored in the source documentation in the virtual computing service environment. The virtual computing resources may be computing instances, block storage, software machine images, archive storage, logs, NoSQL (No Structured Query Language) data stores, virtualized data stores, virtualized relational databases, virtualized network appliances (e.g., network address translation (NAT), gateways, firewalls), virtual private clouds, and other virtual computing resources. In addition, the virtual computing resources may be used to virtually store, monitor, and/or maintain the source documentation.

For example, in one aspect, request responses may be mapped to source documentation supplied by independent 3rd party auditors and/or evaluators. When request responses that are mapped to source documentation are provided to the user, the request responses may be digitally signed by the virtual computing service provider and the corresponding 3rd party auditor/evaluator and stored with or mapped to the source documentation. Users may also request copies of the source documentation in whole, or in part, directly through an application programming interface (API). A dashboard on a display of a computing system may be provided showing compliance status, changes, and history.

FIG. 1 illustrates a system 100 for supplying regulatory compliance evidence for a service provider environment. The system 100 may include one or more users 110, a network 115 that is external to the service provider environment 120 (e.g., the internet), and a service provider environment 120 which provides virtualized computing services (i.e., virtualized computing services, virtualized storage services, virtualized networking, etc.) to a user. The service provider environment 120 may include a regulatory compliance evidence service 130, which may be associated with one or more users 110. The service provider environment 120 may also include a source documentation module 160, a mapping module 150, a machine learning service 170, a digital signature module 180, a confidence level analysis module 190, each of which may execute operations independently and/or in conjunction with each other, and such operations may be executed and managed by the service provider environment 120.

For example, in operation, the users may send requests for regulatory compliance evidence to the regulatory compliance evidence service 130 via the network 115 for providing a response to the request. The network 115 may include the Internet, intranets, extranets, wide area networks (WANs), local area networks (LANs), wired networks, wireless networks, another suitable network, etc., or any combination of two or more such networks. The request may be of one of a variety of formats. In other words, the user may send the request in one of a variety of formats, such as in a text document, markup document, PDF document, an Excel document, a word processing type document, or another electronic format. The request may also include one or more questions having one or more key words, the subject matter items, phrases, and/or questions that may need to be mapped, interpreted, and/or identified in order to retrieve the regulatory compliance evidence. Similarly, the provided response may be provided in the one or more of the variety of formats. The provided response may also include one or more answers relating to the one or more questions having the one or more key words, the subject matter, phrases, and/or mapped, interpreted, and/or identified answers relating to the regulatory compliance evidence. In one aspect, the regulatory compliance evidence may have been previously signed and stored at the time of creating the regulatory compliance evidence. In other words, the regulatory compliance evidence provided in the response includes a previously provided digital signature validating the regulatory compliance evidence. Also, the request and/or queries may be submitted programmatically via an application programming interface (API) and/or via a user interface The key words and/or subject matter associated with the request may be mapped directly and/or indirectly using the mapping module 150 to the regulatory compliance evidence, such as the source documentation. For example, in one aspect the key words and/or subject matter associated with the request may be directly mapped to source documentation maintained for compliance regulations using the mapping module 150. Alternatively, key words and/or subject matter associated with the request may be mapped indirectly to the source documentation maintained for compliance regulations by the source documentation module 160. For example, the key words and/or subject matter associated with the request may be mapped first to a control list. The control list may be a granular statement or list of requirements of what the virtual computing system provider is required to do or execute. In other words, the control list may be a list of rules, terms, categorized key words or phrases, and/or requirements that are stored, mapped, and/or maintained to represent compliance functions. More specifically, the control list may be mapped by the mapping module 150 to the regulatory control evidence, such as the source documentation that may be stored (physically and/or virtually) or linked to by the source documentation module 160. As such, the key words and/or subject matter may be mapped to the control list, which is then mapped to the source documentation.

A confidence level may be developed and/or calculated by the confidence level analysis module 190 that indicates a probability of the accuracy of the mapping of the key words and/or subject matter associated with the request to the control list and/or source documentation. The confidence level may also indicate a probability of the accuracy of the provided summary response and/or whether the regulatory compliance evidence matches the key words and/or subject matter associated with the request. The confidence level may be developed according to historical data, which may include user feedback, relating to previously provided regulatory compliance evidence.

In one aspect, the machine learning service 170 may learn the key words and subject matter relating to each request for providing virtual computing service provider regulatory compliance evidence. That is, the machine learning service 170 may record and learn how the key words and subject matter of the request relate to the compliance evidence provided in a response. The machine learning service 170 may record and learn from the user feedback that may include the confidence level of a previously provided response. A statistical analysis of the key words and/or subject matter relating to the request may also include the confidence level of previously provided responses that may relate to the current request, and the statistical analysis may be provided using machine learning module 170 for interpreting the current request. A response may be provided indicating the regulatory confidence level and the compliance evidence having a digital signature provided by the virtual computing service provider. The response may be dynamically provided on demand.

The storage service module 140 and the mapping module 150 may be used to map, store, retrieve, and/or archive one or more files, storage objects, or file systems relating to the source documentations, responses, user feedback, and/or historical or analytical data. For example, the mapping module 150, in association with the source documentation module 160 and the storage service module 140, may map key words or subject matter relating to source documentation to the request (e.g., one or more questions). The source documentation module 160 and/or the storage service module 140 may include the control list.

The machine learning service 170 may construct and/or update a machine learning model 170 according to the mapped data and feedback provided from the user indicating the accuracy of the provided summary and/or evidence in the response in comparison to the request. The recorded data recorded by the machine learning service during a predetermined time period may be used as training data for establishing predictor functions (e.g., conditions or criteria) for the machine learning model that result in defined output values. Moreover, one or more factors and/or features may be used as input to the machine learning model to establish the output values (e.g., the statistical analysis probability). That is, the machine learning module 170 may model one or more factors and/or features relating to one or more key words, subject matter, and/or source documentation for interpreting one or more questions within the request pertaining to the regulatory compliance evidence.

The regulatory compliance evidence service 130 may 1) receive a request for providing regulatory compliance evidence for a virtual computing service provider. The machine learning module 170 may provide a statistical analysis of subject matter relating to the request using machine learning for interpreting the request. The mapping module 150 may map 2) subject matter associated with the request to the regulatory compliance evidence linked to or mapped through a control list maintained for compliance regulations. A confidence level may be developed 3) using the confidence level analysis module 190 for the regulatory compliance evidence according to historical data relating to previously provided regulatory compliance evidence. The regulatory compliance evidence module 130 may provide 4) response indicating the regulatory confidence level with the compliance evidence having a digital signature provided by the virtual computing service provider. The regulatory compliance evidence module 130 may 5) receive (from the user) and/or provide an authenticated user feedback response indicating an accuracy level that the response matches the request.

Figure 2:
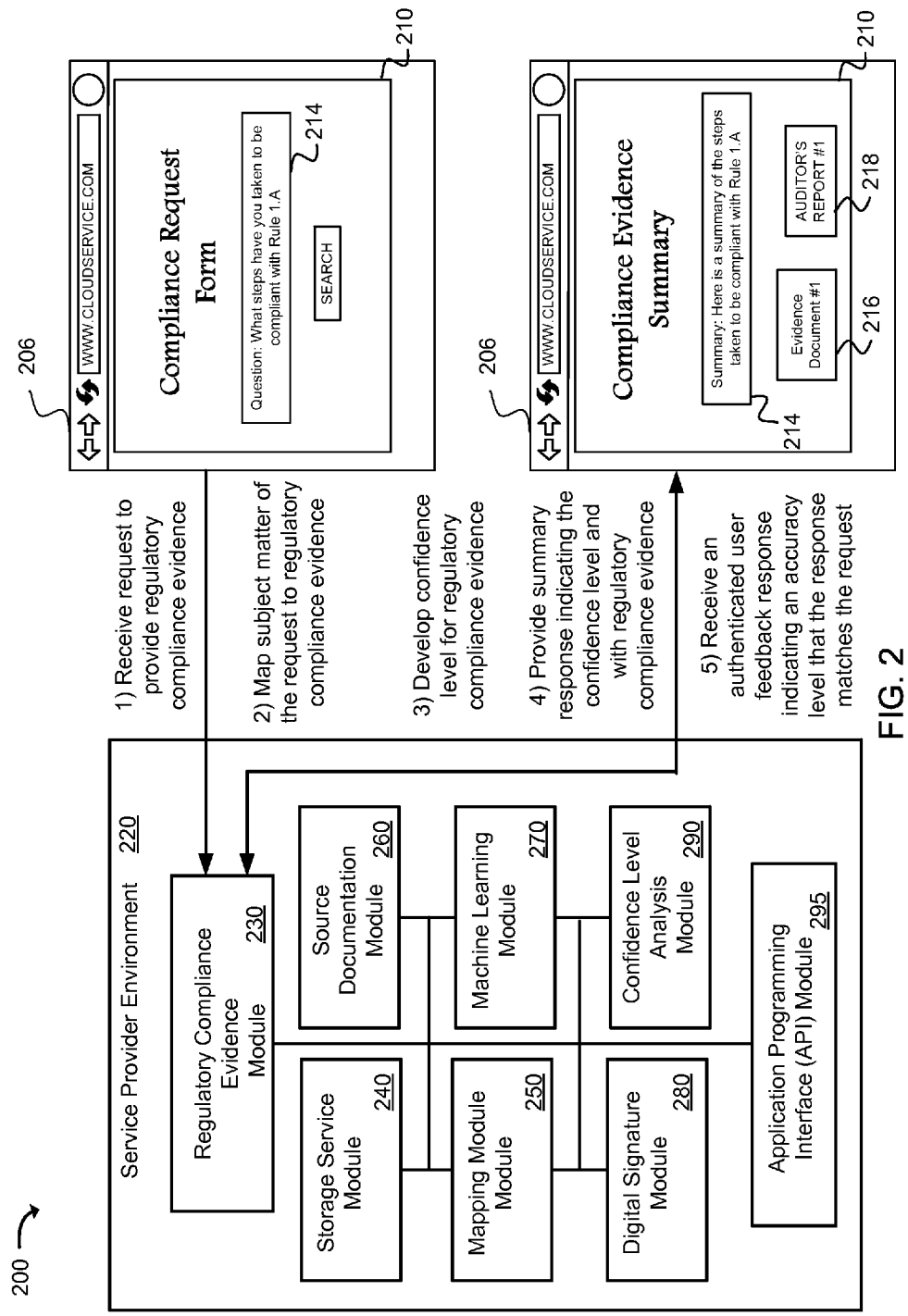
FIG. 2 illustrates a system for displaying regulatory compliance evidence in a service provider environment according to an example of the present technology.

FIG. 2 illustrates a system 200 for displaying regulatory compliance evidence in a service provider environment according to an example of the present technology. In one aspect, the system 200 may be executing on a virtual computing environment that provides virtualized computing, virtualized storage, virtualized networking and other virtualized services that are executing an a hardware substrate.

Similar to FIG. 1, the system 200 may include a service provider environment 220 having a regulatory compliance evidence service 230, a storage service module 240, a source documentation module 260, a mapping module 250, a machine learning module 270, a digital signature module 280, a confidence level analysis module 290, an application programming interface (API) module 295, which may execute operations independently and/or in conjunction with each other, and such operations may be executed and managed by the service provider environment 220. The description of system 100 in FIG. 1 may also be applicable and similar to the description of system 200 in FIG. 2.

The system 200 may also be associated with a user device, such as a smart phone or computer tablet. The user device may present information, such as a web browser 206, on a display, such as a touch screen. In one aspect, a web browser 206 on a device, such as a smart phone or computer tablet may be linked to the service provider environment 220 via the application programming interface (API) module 295. That is, a request may be issued from a request/response interface 210 provided in the web browser 206 and sent to or received from API calls using the API module 295.

In one aspect, the request may be embedded with the web browser 206. More specifically, one or more questionnaire search queries 214 or search forms may be used to capture, auto populate, and/or collect key words, subject matter, phrases, and/or questions related to a questions provided within the one or more questionnaire search queries 214. The regulatory compliance evidence service 230 may receive the request using the request/response interface 210 for providing regulatory compliance evidence of a virtual computing service provider. The machine learning module 270 may provide a statistical analysis of subject matter relating to the request using machine learning for interpreting the request. The mapping module 250 may map subject matter associated with the request to a control list, maintained for compliance regulations, which is mapped to the regulatory compliance evidence mapped.

A confidence level may be developed using the confidence analysis module 290 for the regulatory compliance evidence according to historical data stored in and/or associated with the storage service module 240 relating to previously provided regulatory compliance evidence. The regulatory compliance evidence service 230 may provide a response in the request/response interface 210 indicating the regulatory confidence level along with the compliance evidence having a digital signature provided by the virtual computing service provider and/or a digital signature provided by $3^{rd}$ party auditor and/or evaluator. The digital signature module 280 may be used to digitally sign each response relating to regulatory compliance evidence.

In one aspect, the request/response interface 210 may be provided within the web browser 206 for reporting a summary, a response with evidence, such as evidence document 216 and evidence 218, and/or a summary with the evidence documentation, such as evidence document 216 and evidence 218. Thus, such evidence documentation, such as evidence document 216 and evidence 218, may be provided in the response using the source documentation module 260 from back-end virtual computing service provider systems.

More specifically, for example, the request/response interface 210 may dynamically provide a response mapped to source documentation using the source documentation module 260, with the regulatory compliance evidence having a summary of the regulatory compliance evidence signed with a digital signature of a 3rd party and/or the virtual computing service provider, or an alternative response indicating the regulatory confidence level with the compliance evidence having the digital signature provided by the virtual computing service provider.

It should be noted that the request may be of one of a variety of formats, which may be provided in and/or associated with the request/response interface 210 and/or the web browser 206. In other words, the user may send the request in one of a variety of formats, such as in a PDF document, an Excel document, a word processing type document, manually typed into a query box, and the like. The request may also include one or more questions having one or more key words subject matter items, phrases, and/or questions that may need to be mapped, interpreted, and/or identified in order to retrieve the regulatory compliance evidence. Similarly, the provided response may be provided in one or more of the variety of formats in and/or associated with the request/response interface 210 and/or the web browser 206. The provided response may also include one or more answers relating to the one or more questions having the one or more key words, the one or more subject matter items, phrases, and/or have mapped, interpreted, and/or identified answers relating to the regulatory compliance evidence.

Moreover, the regulatory compliance evidence module 230 may function as a feedback module 358 with the web browser 206 to receive authenticated user feedback response provided by a user via the web browser 206 relating to the response indicating an accuracy level that the response matches the request for developing the confidence level. The regulatory compliance evidence module 230 may work in conjunction with the confidence level analysis module 290 for using the authenticated user feedback response for modifying the confidence level to increase the accuracy level of how the provided response and/or compliance evidence matches the request.

Figure 3:
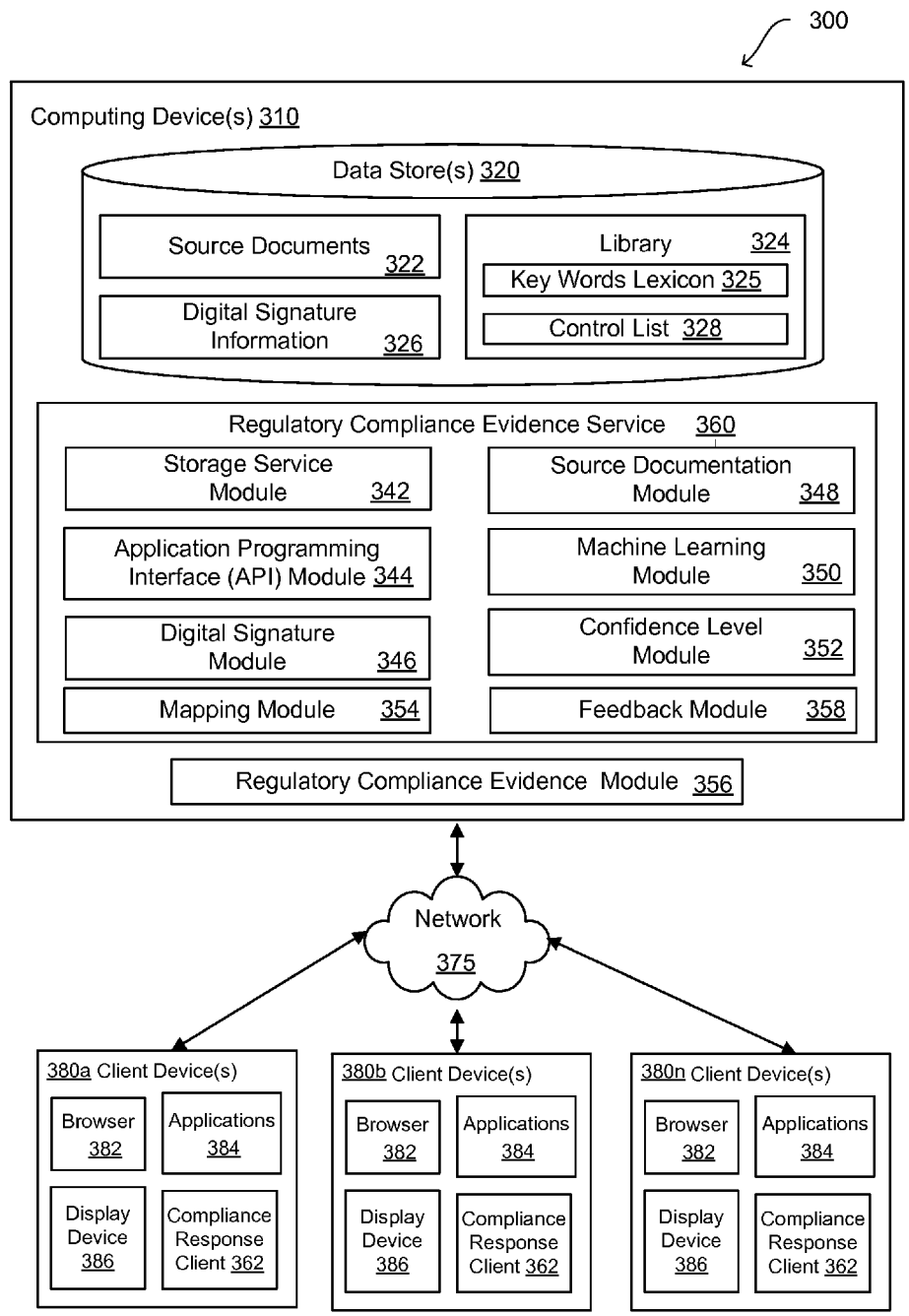
FIG. 3 illustrates a system for dynamically supplying virtual computing service provider regulatory compliance evidence to clients according to an example of the present technology.

FIG. 3 illustrates a networked environment 300 according to one example of the present technology. More specifically, FIG. 3 depicts a system 300 for dynamically supplying regulatory compliance evidence regarding a virtual computing service provider to clients (e.g., users) according to an example of the present technology. The description of system 100 and 200 in FIGS. 1-2 may also be applicable and similar to the description of system 300 in FIG. 3.

The networked environment 300 may include one or more computing devices 310 in data communication with a client device 380a-n (illustrated in FIG. 3 as one or more client devices, such as client devices 380a, 380b, and 380n) by way of a network 375. The network 375 may include the Internet, intranets, extranets, wide area networks (WANs), local area networks (LANs), wired networks, wireless networks, or other suitable networks, etc., or any combination of two or more such networks. The computing device(s) may include a data store 320, a regulatory compliance evidence service 360, and a regulatory compliance evidence module 356.

Various applications, services and/or other functionality may be executed in the computing device 310 according to varying configurations. Also, various data may be stored in a data store 320 that is accessible to the computing device 310. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 320, for example, may be associated with the operation of the various applications and/or functional entities described below.

The data stored in the data store 320 may include a list of available source documents 322, digital signature information 326 for authenticating the responses supplying the source documents 322, or a summary of the source documents 322, as regulatory compliance evidence. The list of available virtual collections of keywords or control lists may be tailored to or specific to the each of the source documents 322.

The data stored in the data store 320 may include a library 324. The library 324 may be accessed for adding key words relating to a received request for obtaining regulatory compliance evidence to a key words lexicon 325 in a virtual collection. The key words lexicon 325 may be selected, stored, updated, and/or retrieved from the library 324, such as, for example, by using a search query, a key words lexicon catalog, and/or from a search query. The library 324 may also include a control list 328 which may be terms, categorized key words, subject matter, phrases, questions, list of rules, and/or requirements that are stored, mapped, and/or maintained for compliance regulations. The control list 328 may be mapped to the source documents 322. The library 324 may be used for information, such as terms, categorized key words, subject matter, phrases, questions, from the key words lexicon 325 for displaying supplying regulatory compliance evidence in a response on a variety of electronic devices, such as mobile devices, mobile phones, tablet computers, desktop computers, etc.

The regulatory compliance evidence service 360 may include a storage service module 342, an application programming interface (API) module 344, an a digital signature module 346, a source documentation module 348, a machine learning module 350, a confidence level module 352, a mapping module 354, and a feedback module 358 which may execute operations independently and/or in conjunction with each other, and such operations may be executed and managed by the computing device(s) 310.

The computing device(s) 310 or regulatory compliance evidence service 360 may use an application such as a web browser to supply the regulatory compliance evidence in a response triggered by receiving and interpreting a request for the regulatory compliance evidence from a user of one of the client devices 380a-n.

In one configuration, a request may be received from one of the client devices 380a-n requesting regulatory compliance evidence about a virtual computing service provider. For example, the request may be a regulatory compliance based question, such as "Do you install servers and test them prior to releasing them for production?" That is, the request may include one or more questions having key words, subject matter items, phrases, and/or questions that may need to be mapped, interpreted, and/or identified in order to retrieve the regulatory compliance evidence. As such, the mapping module 354 may first map the key words, subject matter, phrases, and/or questions to a control list 328. It should be noted that a control list is maintained for the compliance regulations. The control list may be a granular statement of what the virtual computing system provider is required to do or execute to comply with a regulation. That is the control list may be a list of rules, terms, and/or requirements that are stored, mapped, and/or maintained for the compliance regulations. More specifically, the control list is mapped by the mapping module 354 to the regulatory control evidence, such as the source documentation 322 that may be stored (physically and/or virtually) in the data store under control of the source documentation module 348. The mapping module 354 may then map the key words, phrases, and/or questions in the request to the control list, which is mapped to the regulatory control evidence for maintaining compliance certifications. Each time the key words, terms, phrases, and/or questions are mapped, the key words, terms, phrases, and/or questions may be stored in the key words lexicon 325 and/or the control list 328 in the library 324 of the data store 320. By mapping the key words, terms, phrases, and/or questions in the request to the control list, the regulatory compliance evidence mapped to the control list may be retrieved for providing a response with the regulatory compliance evidence. In one aspect, the feedback module 358 may be used to receive authenticated user feedback response provided by a user, such as provided by a client device 380, relating to the response indicating an accuracy level that the response matches the request for developing the confidence level. The feedback module 358 may work in conjunction with the confidence level module 352 for using the authenticated user feedback response for modifying the confidence level to increase the accuracy level of how the provided response and/or compliance evidence matches the request.

The machine learning module 350 may be used in conjunction with the mapping module 354. For example, the machine learning module 350 may record the key words, terms, phrases, questions and/or subject matter of the request as inputs. When a response is provided by the computing device 310 using the regulatory compliance evidence module 356, user feedback may be obtained from the user indicating the accuracy level of how the provided response and/or compliance evidence matches the request. For example, a user of one of the client devices 380a-n may indicate that the provided response having a summary of the regulatory compliance evidence has a rating of 9 out 10. That is, a rating system, or other system of measurement, may be used for evaluating the response by the user. The machine learning module 350 may record each user feedback and the rating assigned by the user. The machine learning module 350 may then, over time, create a machine learning model. The machine learning module 350 in association with the confidence level module 352 may use a statistical regression model to assist in creating a machine learning model to develop the confidence level. The confidence level for the regulatory compliance evidence may be developed according to historical data relating to previously provided regulatory compliance evidence. A response may be provided by the regulatory compliance evidence module 356 indicating the regulatory confidence level with the compliance evidence having a digital signature provided by the virtual computing service provider.

It should be noted that each type of industry subject to regulatory compliance may use a different lexicon or phraseology when requesting compliance evidence. As such, the machine learning module 350 may iteratively develop over time using the statistical analysis probability and the confidence level by indicating the probability that the evidence provided matches the request received. The confidence level developed over time allows for validating, authenticating, and insuring the provided regulatory compliance evidence matches the received request. For example, if a particular phrase is continuously asked by a specific industry, such as the medical device industry and/or the pharmaceutical industry, each response may contain a similar summary of the regulatory compliance evidence and a high probability of the confidence level may be provided to the user based on historical data that has been tracked, monitored, mapped, interpreted, and/or previously provided in a response.

By way of explanation only, returning to the above example, assume the user is a user within the medical device industry and asks in the response "Do you install servers and test them prior to releasing them for production?" Assume this question has been asked by over 100 similar medical device industry users, along with similar key words and/or subject matter, and this input information has been previously mapped to the control list. The machine learning module 354, based on the user feedback, uses the statistical regression model to calculate and create the statistical analysis probability that a provided response provides the appropriate compliance evidence as requested in a request, and/or assist with developing the confidence level. The confidence level module 352 may use the machine learning model and assign a confidence level to a response to the received request. The response may include a summary of the regulatory compliance evidence, such as "yes, we install each server and test them prior to releasing them for production" and a confidence level, such as a statement stating "there is a 98% confidence level indication that such summary and response of the regulatory compliance evidence is accurate and compliant with your received request." In one aspect, the response may include 1) a summary of the regulatory compliance evidence, such as "yes, we install each server and test them prior to releasing them for production," 2) the source documents 322, and 3) a confidence level, such as a statement stating "there is a 98% confidence level indication that such summary and response of the regulatory compliance evidence is accurate and compliant with your received request." An audit trail may be maintained for each received request and each provided response.

It should be noted that, as described herein, machine learning may be an effective tool for use in dynamically supplying virtual computing system provider regulatory compliance evidence. Machine learning may be useful as a method that takes input empirical data, such as data from historical usage patterns, and yields patterns or predictions which may be representative of the underlying mechanism or process that resulted in the generation of the data. Machine learning systems may take advantage of data to capture characteristics of interest having an unknown underlying probability distribution. Machine learning may be used to identify possible relations between observed variables, such file operations or file attributes. Machine learning in the disclosed technology may also be used to recognize complex attack patterns and make intelligent decisions based on input data. In some examples, machine learning systems may generalize from the available data to produce a useful output, such as when the amount of available data is too large to be used efficiently or practically. As applied to the present technology, machine learning may be used to identify pattern of attack on a file system.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

It should be noted that certain processing modules may be discussed in connection with this technology and FIGS. 1-3. In one example configuration, a module or service of FIG. 2 or 3 may be considered a service with one or more processes executing on a server or other computer hardware. Such services may be centrally hosted functionality or a service application that may receive requests and provide output to other services or user devices. For example, modules providing services may be considered on-demand computing that are hosted in a server, cloud, grid, or cluster computing system. An API may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 310 may comprise, for example, a server computer or any other system providing computing capability. Alternatively, a plurality of computing devices 310 may be employed that are arranged, for example, in one or more server banks, computer banks or other computing arrangements. For example, a plurality of computing devices 310 together may comprise a clustered computing resource, virtualization server, a grid computing resource, and/or any other distributed computing arrangement. Such computing devices 310 and data stores 320 may be located in a single installation or may be distributed among many different geographical locations. For purposes of convenience, the computing device 310 is referred to herein in the singular. Even though the computing device 310 is referred to in the singular, it is understood that a plurality of computing devices 310 may be employed in the various arrangements as described above.

The client device 380 may be representative of a target device, social media sites, and/or content sites that may be coupled to the network 375. The client device 380 may comprise, for example, a processor-based system such as a computer system. Such a computer system may be embodied in the form of a desktop computer, a laptop computer, personal digital assistants, cellular telephones, smartphones, voice-controlled playback devices (e.g., smart speakers), set-top boxes, network-enabled televisions, tablet computer systems, electronic book readers, or other devices with like capability. The client device 380 may be configured to execute various applications such as a browser 382, and/or other applications 384. The applications 384 may correspond to code that is executed in the browser 382 (e.g., web applications). The applications 384 may also correspond to standalone applications, such as networked applications.

The applications 384 may include and/or be associated with one or more compliance response clients 362 that are executed on the client device 380 as directed by the regulatory compliance evidence service 360.

The client device 380 may include or be coupled to a display device 386. The browser 382 may be executed on the client device 380, for example, to access and render network pages (e.g. web pages) or other network content served up by the computing device 310 and/or other servers. The display device 386 may comprise, for example, one or more devices such as cathode ray tubes (CRTs), liquid crystal display (LCD) screens, gas plasma-based flat panel displays, LCD projectors, or other types of display devices, etc. In addition, the display device 386 may include an audio device, tactile device (e.g., braille machine) or another output device to feedback to a user.

The client device 380 may include or be coupled to a compliance response client 362. The compliance response client 362 may enable sending or displaying of the automatic, customized responses having the regulatory compliance evidence, such as a summary of the regulatory compliance evidence, the regulatory compliance evidence itself, and/or a confidence level sent to the client device 380 as directed by the regulatory compliance evidence module 360. In one configuration, the compliance response client 362 may be completely built-in to the client device 380. In one configuration, the compliance response client 362 may be partially located on the client device 380 and partially located on the regulatory compliance evidence module 360. Alternatively, the compliance response client 362 may be remote to both the client device 380 and the regulatory compliance evidence module 360.

In one embodiment, the compliance response client 362 may be an application functioning on the client device 380 configured to provide a response of regulatory compliance evidence to the client device 380. For example, the compliance response client 362 may be an application installed on a smart phone. The compliance response client 362 may provide, for example, an audio and/or a visual alert to the client device 380 upon issuing a request to the regulatory compliance evidence module 356 or receiving a response from the regulatory compliance evidence module 356. The compliance response client 362 may publish or display the alert notification and/or a received response with regulatory compliance evidence in a content site, a display ticker, a pop-up window, and/or short message service (SMS) message (e.g., a text message) or other message of limited length, such as a tweet, on the client device 380.

Figure 4:
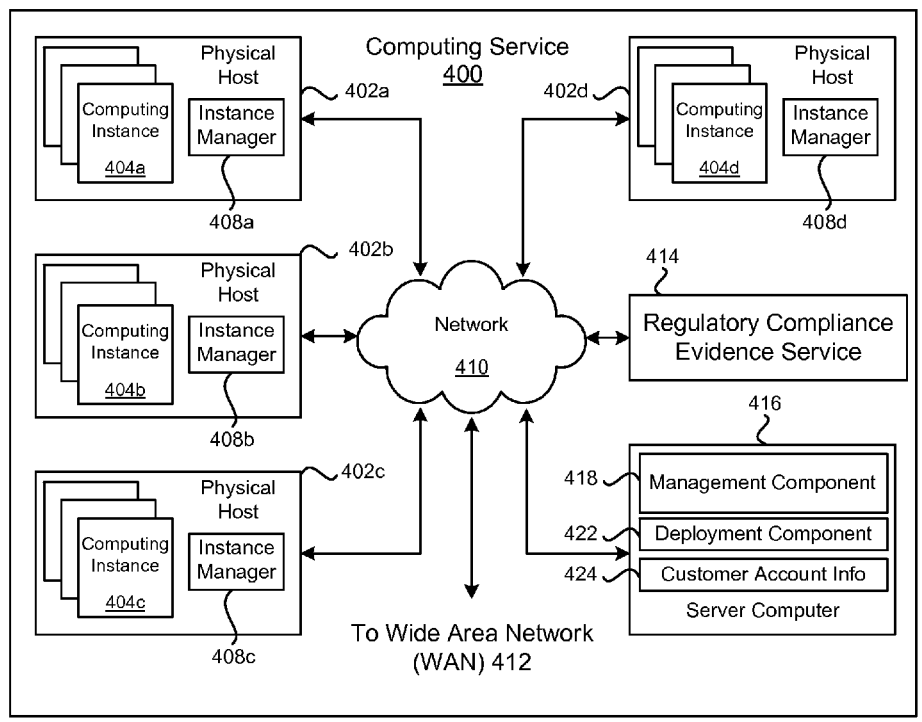
FIG. 4 is a block diagram that illustrates an example computing service environment that includes an attack detection service.

FIG. 4 is a block diagram illustrating an example computing service 400 that may be used to execute software services for dynamically supplying regulatory compliance evidence regarding a virtual computing service provider. In particular, the computing service 400 depicted illustrates one environment in which the technology described herein may be used. The computing service 400 may be one type of environment that includes various virtualized service resources that may be used, for instance, to host computing instances 404*a-d* on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of users may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End users may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402*a-d*. While four server computers are shown, any number may be used, and large data centers may include thousands of server computers. The computing service 400 may provide computing resources for executing computing instances 404*a-d*. Computing instances 404*a-d* may, for example, be virtual machines. A virtual machine may be an instance of a software implementation of a machine (i.e., a computer) that executes applications like a physical machine. In the example of a virtual machine, each of the server computers 402*a-d* may be configured to execute an instance manager 408*a-d* capable of executing the instances. The instance manager 408*a-d* may be a hypervisor, virtual machine monitor (VMM), or another type of program configured to enable the execution of multiple computing instances 404*a-d* on a single server. Additionally, each of the computing instances 404*a-d* may be configured to execute one or more applications.

Some of the servers may be used for executing an attack detection service. For example, a server computer 414 may execute an attack detection service for preventing file system attacks in a computing service environment.

One or more server computers 416 may be reserved to execute software components for managing the operation of the computing service 400 and the computing instances 404*a-d*. A server computer 416 may execute a management component 418. A user may access the management component 418 to configure various aspects of the operation of the computing instances 404*a-d* purchased by a user. For example, the user may setup computing instances 404*a-d* and make changes to the configuration of the computing instances 404*a-d*.

A deployment component 422 may be used to assist users in the deployment of computing instances 404*a-d*. The deployment component 422 may have access to account information associated with the computing instances 404*a-d*, such as the name of an owner of the account, credit card information, country of the owner, etc. The deployment component 422 may receive a configuration from a user that includes data describing how computing instances 404*a-d* may be configured. For example, the configuration may include an operating system, provide one or more applications to be installed in computing instances 404*a-d*, provide scripts and/or other types of code to be executed for configuring computing instances 404*a-d*, provide cache logic specifying how an application cache may be prepared, and other types of information. The deployment component 422 may utilize the user-provided configuration and cache logic to configure, initialize, and launch computing instances 404*a-d*. The configuration, cache logic, and other information may be specified by a user accessing the management component 418 or by providing this information directly to the deployment component 422.

User account information 424 may include any desired information associated with a user of the multi-tenant environment. For example, the user account information may include a unique identifier for a user, a user address, billing information, licensing information, customization parameters for launching instances, scheduling information, etc. As described above, the user account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402*a-d*, 416. The network 410 may be a local area network (LAN) and may be connected to a Wide Area Network (WAN) 412 or the Internet, so that end users may access the computing service 400. The network topology illustrated in FIG. 4 has been simplified; many more networks and networking devices may be utilized to interconnect the various computing systems disclosed herein.

Figure 5:
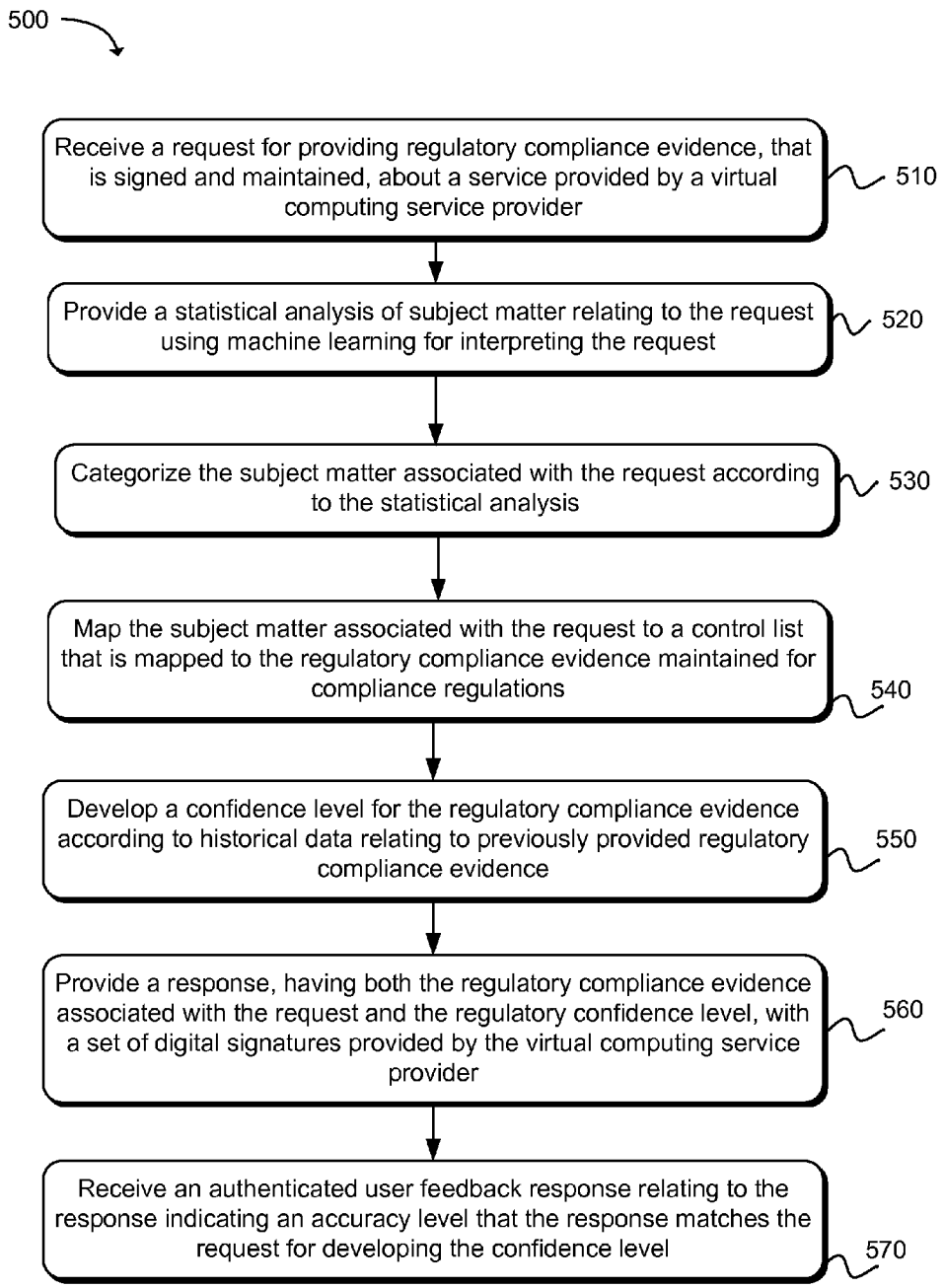
FIG. 5 is a flowchart of an example method for supplying regulatory compliance evidence in a service provider environment according to an example of the present technology.

FIG. 5 is a flowchart of an example method 500 for supplying regulatory compliance evidence in a service provider environment according to an example of the present technology. The functionality may be implemented as a method and executed as instructions on a machine, where the instructions are included on at least one computer readable medium or one non-transitory machine-readable storage medium. For example, starting in block 510, a request for providing regulatory compliance evidence about a service provided by a virtual computing service provider may be received. The regulatory compliance evidence may have previously been digitally signed and/or stored at the time of creation of the regulatory compliance evidence. In one aspect, the regulatory compliance evidence may have previously been digitally signed by the virtual computing service provider and/or a third party verification service.

A statistical analysis of subject matter relating to the request may be provided using machine learning for interpreting the request, as in block 520. As in block 530, the subject matter associated with the request may be categorized according to the statistical analysis. The control list is mapped to the regulatory compliance evidence. The categorized subject matter may be mapped to a control list, maintained for compliance regulations, that is mapped to the regulatory compliance evidence for associating the regulatory compliance evidence with the request, as in block 540. As in block 550, a confidence level for the regulatory compliance evidence may be developed according to historical data relating to previously provided regulatory compliance evidence. As in block 560, a response, having both the regulatory compliance evidence associated with the request and the regulatory confidence level, may be provided with a set of digital signatures provided by the virtual computing service provider. In one aspect, the set of digital signatures may include an aggregation of digital signatures relating to at least one of regulatory compliance evidence and/or the authenticated user feedback. An authenticated user feedback response may be provided relating to the response indicating an accuracy level that the response matches the request for developing the confidence level, as in block 570.

In one aspect, the request may be of one of a variety of formats. In other words, the user may send the request in one of a variety of formats, such as in a PDF document, an Excel document, a word processing type document, or another electronic format. The request may also include one or more questions having one or more key words, subject matters, phrases, and/or questions that may need to be mapped, interpreted, and/or identified in order to retrieve the regulatory compliance evidence. Similarly, the provided response may be supplied in the one or more of the variety of formats. The provided response may also include one or more answers relating to the one or more questions having the one or more key words, subject matter items, phrases, and/or have mapped, interpreted, and/or identified answers relating to the regulatory compliance evidence.

Figure 6:
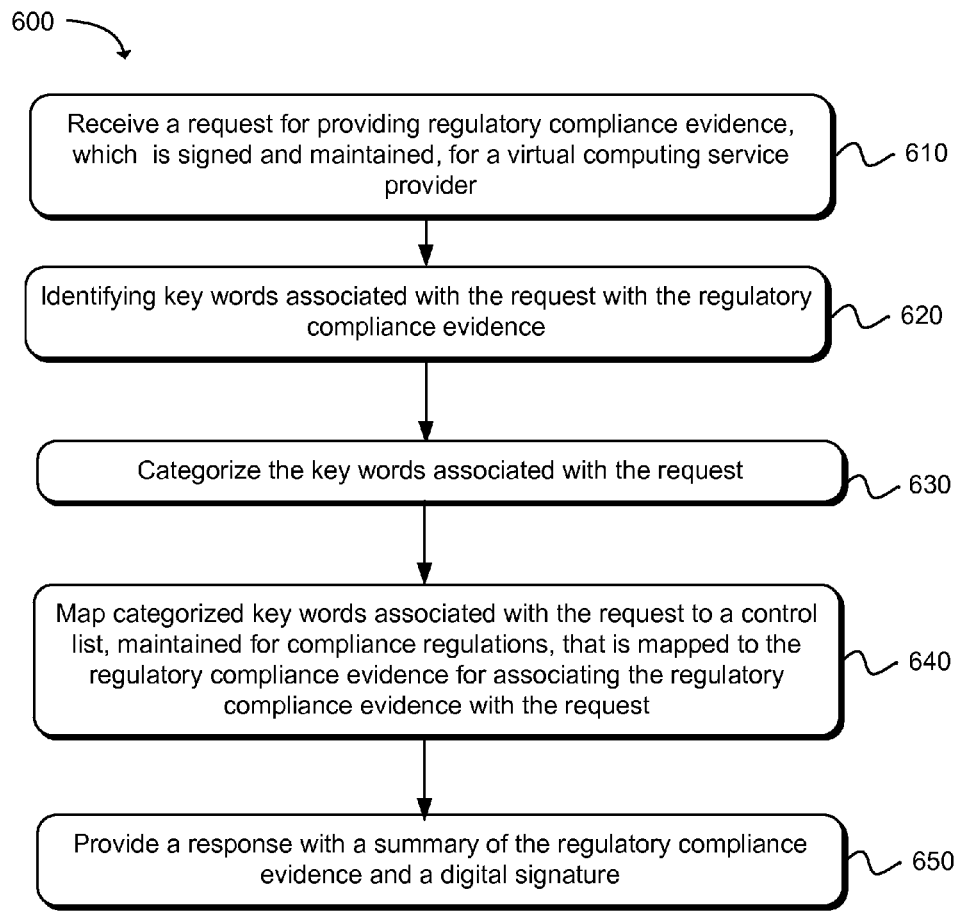
FIG. 6 is a flowchart of an additional example method for supplying regulatory compliance evidence within a computing service environment according to an example of the present technology.

Turning now to FIG. 6, a flow diagram illustrates an additional example method 600 for supplying regulatory compliance evidence within a computing service environment. The functionality may be implemented as a method executed as instructions on a machine, where the instructions are included on at least one computer readable medium or one non-transitory machine-readable storage medium. Starting in block 610, a request for providing a virtual computing service provider's regulatory compliance evidence, which is signed and maintained by the virtual computing service provider, may be received.

As in block 620, key words associated with the request may be identified with the regulatory compliance evidence. As in block 630, the key words associated with the request may be categorized. As in block 640, the categorized key words associated with the request may be mapped to a control list, maintained for compliance regulations, that is mapped to the regulatory compliance evidence for associating the regulatory compliance evidence with the request. In one aspect, a control list may be mapped to the regulatory compliance evidence maintained for compliance regulations. The key words associated with the request may be identified with key words, phrases, questions, and/or requirements associated with the control list. Upon identifying similarly related key words, phrases, questions, and/or requirements in the control list, those similarly related key words, phrases, questions, and/or requirements in the control list are used to match the request with the regulatory compliance evidence. Moreover, the regulatory compliance evidence matching and/or associated with the similarly related key words, phrases, questions, and/or requirements in the control list is used for providing a response. The regulatory compliance evidence may also include compliance evidence about a service provided by the virtual computing service provider.

A summary response may be provided indicating the regulatory confidence level with the compliance evidence having a set of digital signatures, as in block 650. In one aspect, the set of digital signatures may include an aggregation of digital signatures relating to at least the regulatory compliance evidence and/or any authenticated user feedback response. A first digital signature for a response may be from a third-party verification service or a third-party tester who has supplied or verified the regulatory compliance evidence. Then a second digital signature may be provided from the computing service provider. A confidence level for the regulatory compliance evidence may be developed according to historical data relating to previously provided regulatory compliance evidence. In one aspect, request-response cycle (e.g., a cycle that starts with a request and ends with a response and then starts again with a request) may be conducted at a sufficient frequency to constitute an authenticated continuous monitoring operation. That is, an authenticated continuous monitoring operation is executing at a predefined rate and/or a time period frequency to monitor a cycle of one or more series of requests to responses. For example, the authenticated continuous monitoring operation may include being notified of any changes to any regulatory compliance evidence, the request, and/or the response since a most recent request on items queried (e.g. 5 days ago you asked about our compliance with rule 101, password management, we have new evidence to present to you. See attached/below/updated response) or a time series of queries showing continuity of evidence (or positive/negative deviation) over time.

In one aspect, in conjunction with and/or as part of at least one block of FIGS. 5-6, the method 700 may include each of the following. The response may be authenticated by encrypting a portion of data associated with the response for providing the digital signature. User feedback may be received relating to the response indicating an accuracy level that the response matches the request for developing the confidence level. A virtual computing service provider key and/or a $3^{rd}$ party auditor or evaluator key may be provided for the digital signature. The user feedback relating to the response may be recorded. In one aspect, a statistical regression model may be created to assist in creating a machine learning model to develop the confidence level. The statistical analysis probability may be used indicating whether the key words are accurately mapped to the regulatory compliance evidence. Also, in one aspect, a content lexicon may be iteratively built based the key words mapped to the regulatory compliance evidence for increasing the confidence level. The response may also be provided with source documentation of the compliance evidence. Also, the source documentation of the compliance evidence may be analyzed for determining the response based on the mapping of the key words. In one aspect, the source documentation includes at least change management records, document control records, service level agreement performance records, regulatory compliance service records, hardware records, and software records. In one aspect, the response may be provided via an application programming interface (API). The response may be displayed via a dashboard indicating a compliance status, changes relating to the regulatory compliance evidence, and history of the regulatory compliance evidence.

In one aspect, the response may be displayed via a dashboard indicating compliance status, changes relating to the regulatory compliance evidence, and history of the regulatory compliance evidence. The response may be provided with a virtual computing service provider key for the digital signature. More specifically, a third party key may be provided for a third party and a virtual computing service provider key for the virtual computing service provider for providing the digital signature.

Figure 7:
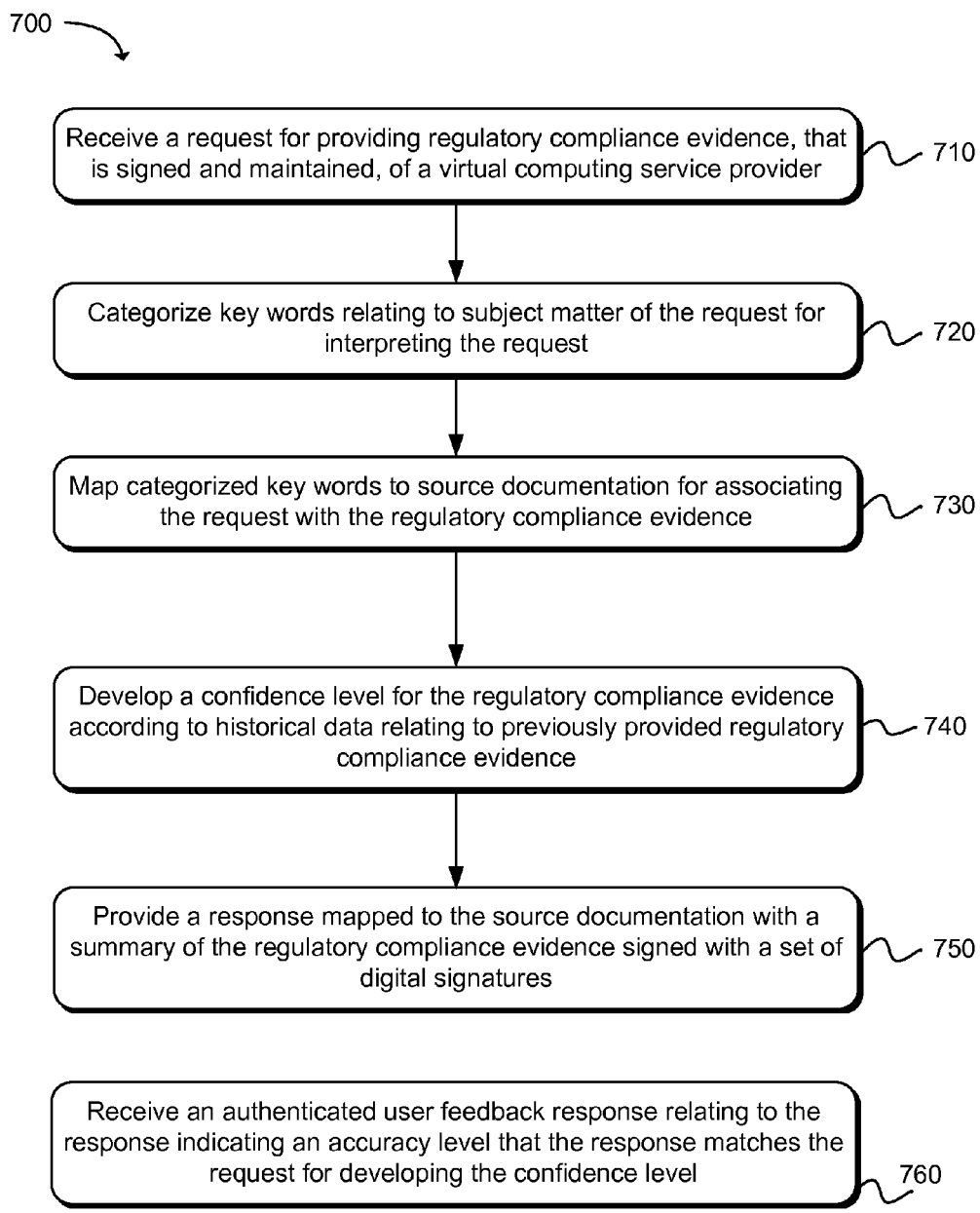
FIG. 7 is a flowchart of an additional example method for dynamically supplying virtual computing service provider regulatory compliance evidence to clients in a service provider environment according to an example of the present technology.

Moving now to FIG. 7, a flow diagram illustrates an example method 700 for dynamically supplying virtual computing service provider regulatory compliance evidence to clients in a service provider environment. Starting in block 710, a request for providing regulatory compliance evidence, which has been signed and/or maintained by the virtual computing service provider, of a virtual computing service provider may be provided. As in block 720, key words relating to subject matter of the request may be categorized for interpreting the request. The categorized key words may be mapped to source documentation for associating the request with the regulatory compliance evidence, as in block 730.

As in block 740, a confidence level for the regulatory compliance evidence may be developed according to historical data relating to previously provided regulatory compliance evidence. As in block 750, a response mapped to the source documentation may be provided with a summary of the regulatory compliance evidence signed with a set of digital signatures. In one aspect, for example, a response mapped to source documentation supplied by a third party with the regulatory compliance evidence having a summary of the regulatory compliance evidence signed with a digital signature of the third party and the virtual computing service provider may be dynamically provided, or an alternative response may be dynamically provided indicating the regulatory confidence level with the compliance evidence having the digital signature provided by the virtual computing service provider. As in block 750, an authenticated user feedback response may be received (e.g., provided by a user) relating to the response indicating an accuracy level that the response matches the request for developing the confidence level. In one aspect, the set of digital signatures may include an aggregation of digital signatures relating to at least one of regulatory compliance evidence and/or the authenticated user feedback.

Figure 8:
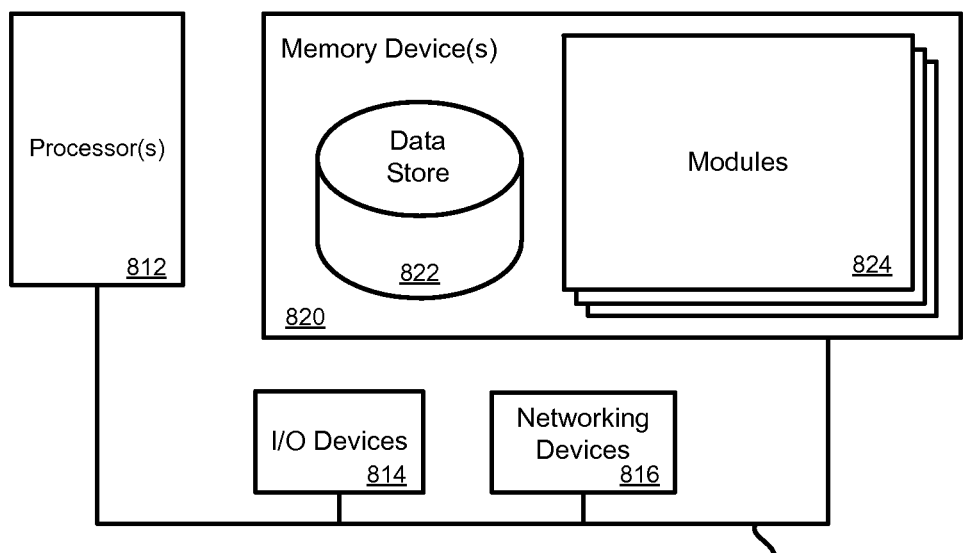
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for supplying regulatory compliance evidence for a service provider environment, the method comprising:
receive a request for providing signed regulatory compliance evidence about a service provided by a service provider, using at least one hardware processor and a memory configured with executable instructions;
provide a statistical analysis of subject matter relating to the request using machine learning for interpreting the request, using the at least one hardware processor and the memory;
categorize the subject matter associated with the request according to the statistical analysis, using the at least one hardware processor and the memory;
map categorized subject matter associated with the request to a control list, maintained for compliance regulations, that is mapped to the signed regulatory compliance evidence for associating the regulatory compliance evidence with the request, using the at least one hardware processor and the memory;
develop a confidence level for the signed regulatory compliance evidence according to historical data relating to previously provided regulatory compliance evidence, wherein the confidence level indicates a statistical probability that the signed regulatory compliance evidence matches key words in the request, and a statistical regression model is used to create a machine learning model to establish the statistical probability by comparing currently mapped key words with previously mapped key words in previous requests, using the at least one hardware processor and the memory;
provide a response, having both the regulatory compliance evidence associated with the request and the confidence level, with a set of digital signatures provided by the service provider, using the at least one hardware processor and the memory; and
receive an authenticated user feedback response relating to the response indicating an accuracy level that the response matches the request, using the at least one hardware processor and the memory.

2. The method of claim 1, further comprises executable instructions that authenticate the response by encrypting a portion of data associated with the response for providing the set of digital signatures, using the at least one processor and memory, wherein the set of digital signatures includes an aggregation of digital signatures relating to at least one of regulatory compliance evidence or the authenticated user feedback.

3. The method of claim 1, further comprises executable instructions that:
provide the response with at least a summary of the regulatory compliance evidence, and
use the authenticated user feedback response for modifying the confidence level.

4. A computer-implemented method, the method comprising:
receive a request for providing regulatory compliance evidence, which is signed and maintained, for a virtual computing service provider, using at least one hardware processor and a memory configured with executable instructions;
identify key words associated with the request for the regulatory compliance evidence, using the at least one hardware processor and the memory;
categorize the key words associated with the request, using the least one hardware processor and the memory;
map categorized key words associated with the request to a control list, maintained for compliance regulations, that is mapped to the regulatory compliance evidence for associating the regulatory compliance evidence with the request, using the at least one hardware processor and the memory;

develop a confidence level for the regulatory compliance evidence that indicates a statistical probability that the regulatory compliance evidence matches the key words associated with the request, and a statistical regression model is used to create a machine learning model to establish the statistical probability by comparing currently mapped key words with previously mapped key words in previous requests, using the at least one hardware processor and the memory; and provide a response with a summary of the regulatory compliance evidence and a set of digital signatures, using the at least one hardware processor and the memory.

5. The method of claim 4, further comprising executable instructions that authenticate the response by encrypting a portion of data associated with the response to provide the digital signature, using the at least one processor and memory, wherein the set of digital signatures includes an aggregation of digital signatures relating to the regulatory compliance evidence.

6. The method of claim 4, further comprising executable instructions that:

develop a confidence level for the regulatory compliance evidence according to historical data relating to previously provided regulatory compliance evidence.

7. The method of claim 6, further comprising executable instructions that record the user feedback relating to the response.

8. The method of claim 7, further comprising executable instructions that use a statistical regression model to assist in creating a machine learning model to developing the confidence level.

9. The method of claim 8, further comprising executable instructions that use the compliance evidence to indicate whether the key words are accurately mapped to the control list.

10. The method of claim 9, further comprising executable instructions that iteratively build a content lexicon based the key words mapped to the compliance evidence for increasing the confidence level.

11. The method of claim 8, further comprising executable instructions that:

provide the response via an application programming interface (API); and execute an authenticated continuous monitoring operation at a predefined rate or time period frequency to monitor and identify any changes during a cycle of requests and responses.

12. The method of claim 8, further comprising executable instructions that display the response via a dashboard indicating at least one of compliance status, changes relating to the regulatory compliance evidence, and or history of the regulatory compliance evidence.

13. The method of claim 4, further comprising executable instructions that provide the response with source documentation as the regulatory compliance evidence.

14. The method of claim 4, further comprising executable instructions that analyze source documentation for determining the regulatory compliance evidence to provide in the response based on the mapping.

15. The method of claim 14, wherein the source documentation includes at least one of change management records, document control records, service level agreement performance records, regulatory compliance service records, hardware records, compliance documentation relating to a service provided by the virtual computing service provider, or software records.

16. The method of claim 4, further comprising executable instructions that provide a virtual computing service provider key for signing a digital signature to be included in the set of digital signatures.

17. A method for providing compliance evidence for a virtual computing service provider, the method comprising:

receive a request for providing regulatory compliance evidence, that is signed and maintained, for a virtual computing service provider, using at least one hardware processor and a memory configured with executable instructions;

categorize key words relating to subject matter of the request for interpreting the request, using the at least one hardware processor and the memory;

map categorized key words relating to subject matter of the request to source documentation for associating the request with the regulatory compliance evidence, using the at least one hardware processor and the memory;

develop a confidence level for the regulatory compliance evidence according to historical data relating to previously provided regulatory compliance evidence, wherein the confidence level indicates a statistical probability that the signed regulatory compliance evidence matches key words in the request, and a statistical regression model is used to create a machine learning model to establish the statistical probability by comparing currently mapped key words with previously mapped key words in previous requests, using the at least one hardware processor and the memory;

provide a response mapped to the source documentation with a summary of the regulatory compliance evidence signed with a set of digital signatures, using the at least one hardware processor and the memory; and receive an authenticated user feedback response relating to the response indicating an accuracy level that the response matches the request in order to modify the confidence level, using the at least one hardware processor and the memory.

18. The method of claim 17, further comprises executable instructions that authenticate the response by encrypting a portion of data associated with the response for providing the digital signature, using the at least one processor and memory, wherein the set of digital signatures includes an aggregation of digital signatures relating to at least one of regulatory compliance evidence or the authenticated user feedback.

19. The method of claim 17, further comprises executable instructions that:

provide a statistical analysis of subject matter relating to the request using machine learning in order to categorize key words, using the least one processor and memory.

20. The method of claim 19, further comprises executable instructions that use a statistical regression model to assist in creating the machine learning model to establish the accuracy level of mapping the key words to the regulatory compliance evidence to assist in developing the confidence level.

* * * * *